(12) United States Patent
Xiao

(10) Patent No.: US 6,571,337 B1
(45) Date of Patent: May 27, 2003

(54) DELAYED SECURE DATA RETRIEVAL

(75) Inventor: Cun Xiao, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/215,060

(22) Filed: Dec. 17, 1998

Related U.S. Application Data

(60) Provisional application No. 60/090,498, filed on Jun. 24, 1998.

(51) Int. Cl.[7] .................................................. G06F 11/30
(52) U.S. Cl. ........................ 713/194; 713/161; 713/168; 713/170; 713/176; 713/194; 380/277; 380/278; 380/281
(58) Field of Search ................................. 713/161, 168, 713/170, 171, 176, 180, 182; 380/277, 281, 278

(56) References Cited

U.S. PATENT DOCUMENTS

| | | | |
|---|---|---|---|
| 5,606,617 A | 2/1997 | Brands | 380/30 |
| 5,638,446 A | 6/1997 | Rubin | 380/25 |
| 5,706,513 A | 1/1998 | Bahls et al. | 395/621 |
| 5,757,917 A | 5/1998 | Rose et al. | 380/25 |
| 5,757,920 A | 5/1998 | Misra et al. | 380/25 |
| 5,922,074 A * | 7/1999 | Richard et al. | 713/200 |
| 5,926,549 A * | 7/1999 | Pinkas | 380/25 |
| 5,926,624 A * | 7/1999 | Katz et al. | 395/200.47 |

* cited by examiner

*Primary Examiner*—Thomas R. Peeso
(74) *Attorney, Agent, or Firm*—Sughrue Mion, PLLC

(57) ABSTRACT

A method, apparatus and article of manufacture for a computer-implemented method of delayed secure data retrieval. Actual data entities are not packed into an information entity. Rather, the data entities are only retrieved upon request. Instead, the information entity contains a delayed retrieval description. The data entities which are eventually to be retrieved are encrypted to enforce the terms and conditions imposed upon accessing the entities. The encryption or content key used to encrypt the data item is determined when the information entity is packed and is stored in the cryptolope in an encrypted form. Finally, the content key is only stored in the cryptolope. The publisher does not need to maintain a database to store content keys and information regarding which content key has been used to encrypt which data entity.

18 Claims, 3 Drawing Sheets

DELAYED SECURE DATA RETRIEVAL

PROVISIONAL APPLICATION

This application claims the benefit of U.S. Provisional Application No. 60/090,498, entitled, "Delayed Secure Data Retrieval," filed on Jun. 24, 1998, by Cun Xiao, which is incorporated by reference herein.

BACKGROUND OF THE INVENTION

1. Field of the Invention

This invention relates in general to an electronic library network, and, in particular, to delayed secure data retrieval over an electronic library network.

2. Description of the Related Art

With the advent of network technologies, such as the Internet and the World Wide Web (WWW), new systems such as digital libraries have appeared. These libraries contain a wide variety of information in various forms stored as digital data entities. Such libraries require the management of the digital contents of the library and of content distribution. Often, the digital entities must be distributed over networks, between servers, and to client machines. The wide distribution of the digital contents requires protection of the contents, i.e. limiting who gets access to the data entities and how the data entities can be accessed. For example, terms and conditions may be imposed, which must be satisfied before a user can obtain access to the data entities. Further, the integrity and authenticity of data entities must be maintained.

In other words, there must be an access control mechanism which limits access to the data entities. Further, there must be a secure method of transmitting the data entities.

To provide such protection, past systems have used schemes such as secured socket layer (SSL) transmission. Under this scheme, the two parties to the transmission agree on one session key, which is used from then on to encrypt the data entity. Under such a scheme, both parties are trusted. However, this scheme may not be practical when dealing with a publisher of information, maintaining a digital library which can be accessed by many unknown users and when dealing with rights associated with the information in the library, such as copyright protection. A publisher will want to limit access to data entities to those users who have met imposed conditions, without having to establish a session key for each user, which can be cumbersome.

Another scheme for protecting the distribution of data entities is for an information supplier, e.g. a publisher, to distribute data entities in encrypted form along with an encryption key, such as with IBM Corporation's CRYPTOLOPE scheme. In this manner, information can be distributed freely using any means without loss of protection. Under this scheme, a clearance center must verify that the user has satisfied the criteria to receive the data entity according to the terms and conditions (T&Cs) associated with that data entity (e.g., by paying a fee), before providing the user with the corresponding decryption key. Any business transaction (e.g., payment) can be handled by yet another party.

The cryptolope scheme will now be described in further detail. The cryptolope is a secure data container which contains a collection of data items, and is digitally signed, so that the container is tamper detectable. A digital signature is an encryption of a message digest by a private key from a public and private key pair. The private key is kept secretly, while the public key is known to the public. A text encrypted by a private key can only be decrypted by its corresponding public key. A message digest is a result from a one-way function of a piece of data (also called a hash function). It is used to authenticate the piece of data in that if the data is changed, it will have a different message digest. Therefore, when a data package with a digital signature is sent from A to B, B can use A's public key to decrypt the signature to make sure that the package is from A and that nobody has changed the content. The data items in the cryptolope can have terms and conditions, such as pay $1.00 for viewing, enter a password or present a digital certificate, in which case, the data items are encrypted. Thus, the user must indirectly obtain the corresponding decryption key using a cryptolope player, a special opener application, to unlock the data items. When an end-user receives and then opens the cryptolope using the cryptolope player, the end user must then present information to meet the terms and conditions to a clearance center. The clearance center can be run by the information supplier, an authorized agent of the supplier, or a mutually trusted third party who provides the clearing service. The clearance center must verify that the user has met the terms and conditions before providing the user with the decryption key. The clearance center then tells the cryptolope player used by the end user to open the cryptolope. The cryptolope player then opens the cryptolope and the program can then control actions which the end user is allowed to perform on the data entity, e.g. view, save or print.

Under this traditional cryptolope scheme, the encrypted data entities are packed in the cryptolope itself along with the encryption key, encrypted by a key of the clearance center. However, this cryptolope scheme presents a problem with modern day data entities. Such data entities, which may represent video, audio, software, etc. can be quite large. Transmission of such large data entities can be very slow, and inefficient. The inefficiency is especially evident when the user may be interested in only a portion of the data entity, or the user may decide that he/she is not interested in any of the data entity after all.

SUMMARY OF THE INVENTION

To overcome the limitations in the prior art described above, and to overcome other limitations that will become apparent upon reading and understanding the present specification, the present invention discloses a method, apparatus and article of manufacture for a computer-implemented method of delayed secure data retrieval scheme.

In accordance with the present invention, the actual data entities are not packed into the cryptolope itself. Rather, the data entities are only retrieved upon request. Instead, the cryptolope, in accordance with the present invention, is an information entity, containing, inter alia, a delayed retrieval description, used to retrieve a data entity when requested. Further, the data entities which are eventually to be retrieved are encrypted to enforce the terms and conditions imposed upon accessing the entities. Also; the encryption or content key, used to encrypt the data item is determined when the cryptolope, or information entity, is packed and is stored in the cryptolope in an encrypted form. Only the publisher can unlock the content key. Therefore the end user cannot unlock the content in any way without satisfying the terms and conditions imposed. Finally, the content key is only stored in the cryptolope. Thus, the publisher does not need to maintain a database to store content keys and information regarding which content key has been used to encrypt which data entity.

Thus, an object of the present invention is to avoid the unnecessary transmission of large volumes of data.

Another object of the present invention is to separate delivery of an information entity and the real content, the data entities. This allows the initial transmission of information about the data, i.e. description data or meta data, without having to transmit the data entity itself.

Another object of the present invention is to reduce key management and storage requirements by eliminating the need to maintain a database containing content keys and information regarding how the keys are related to the data entity.

BRIEF DESCRIPTION OF THE DRAWINGS

The above objects and advantages of the present invention will become more apparent by describing in detail preferred embodiments thereof with reference to the attached drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

Hardware Environment

Figure 1:
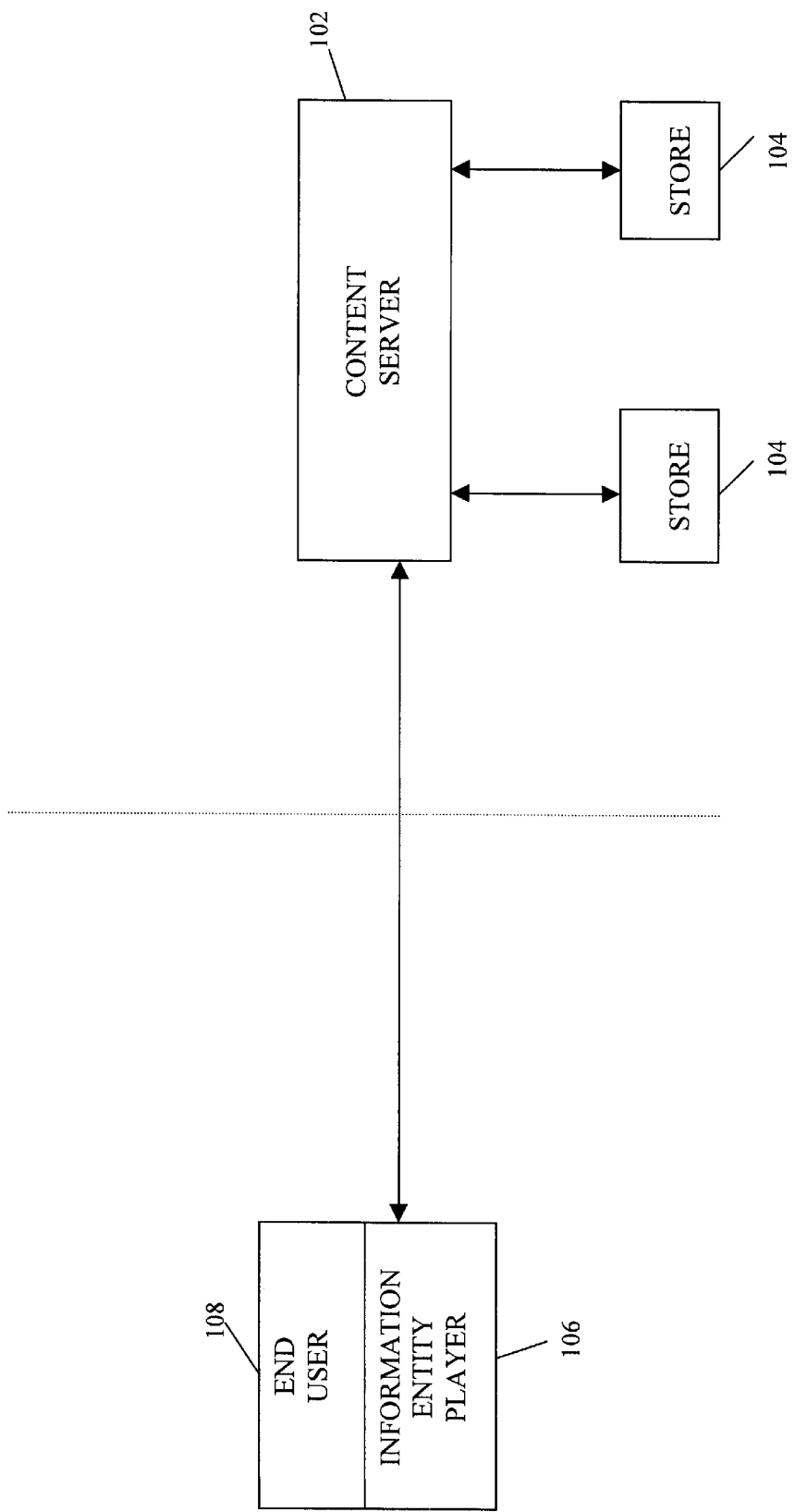
FIG. 1 illustrates an exemplary hardware environment in which the present invention may be practiced.

FIG. 1 illustrates an exemplary hardware environment of a library network in which the present invention may be practiced to provide delayed secure data retrieval. In the exemplary environment, a content or library server 102, typically a workstation, is maintained at a publisher. The server 102 maintains control of data entities, which are stored in stores 104 and manages distribution of the entities. For example, the server may act as an access control enforcement manager for enforcing access control of the data entities stored in stores 104 and determining when access conditions have been met. Access control may involve verification that terms and conditions have been met. The information entity player 106 provides an interface between the end user or client entity 108, which may also be a workstation, and the content server 102. Information entity player 106 further manages information entities, e.g. cryptolopes, received from and sent to the server 102.

The library network of FIG. 1 may generally be implemented with a mixture of operating systems, communication subsystems, database management subsystems, file servers and other hardware and software components.

The present invention may also be viewed as a set of computer programs executable on one or more electronic digital computers to provide delayed secure data retrieval. The computer programs may be tangibly embodied in a computer-readable medium, e.g. one or more of the stores 104 or the information entity player 106.

Thus, the present invention may be implemented as a method, apparatus, or article of manufacture for delayed secure data retrieval over the library network using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

In accordance with the present invention cryptolopes or information entities are used to initially transmit meta data, i.e. descriptive information about the data, rather than the data itself. The meta data contains information regarding where the data can be obtained and how to encrypt the data before its transmission. Two levels of security are provided in accordance with the present invention when terms and conditions are applied to a data item. First, the data item, retained at the content server is sent out in an encrypted form only when requested. Second, the content encryption key used to encrypt the data is itself encrypted and stored in the information entity. Since the encryption key is encrypted, it is not possible for just anyone to access the data entity at the server. Thus, the publisher chooses an encryption key, encrypts the key and packs the key and delayed retrieval description in the cryptolope.

Figure 2:
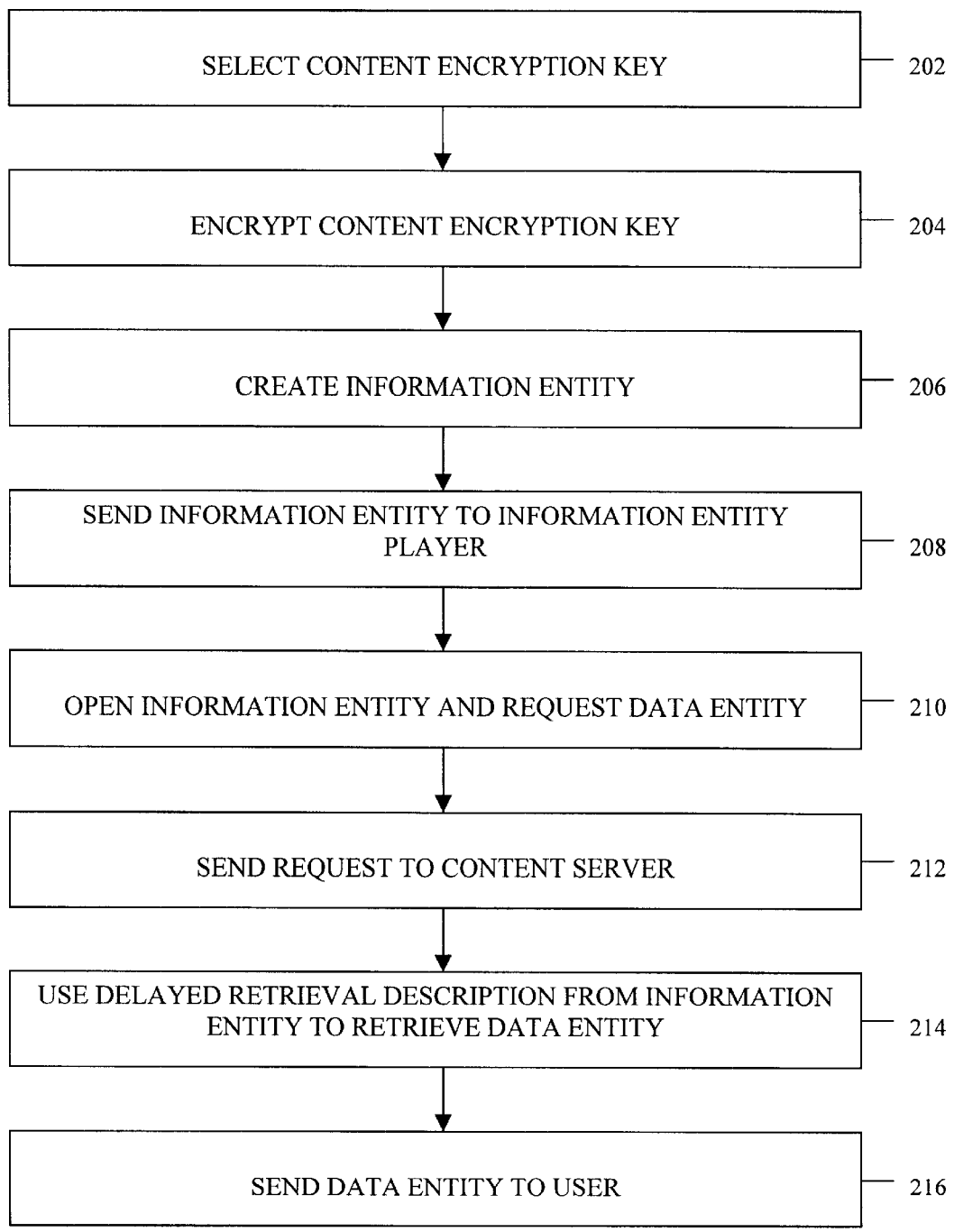
FIG. 2 illustrates a flowchart showing the steps carried out in implementing the present invention.

The details of the steps carried out in performing the present invention will now be presented in conjunction with FIG. 2 which illustrates a flow chart of the steps.

In accordance with the present invention, the publisher makes an initial determination that a data item warrants delayed retrieval. This might be the case, for example, for large data entities, such as video, audio or software based entities. Alternatively, a publisher may decide that all data entities are to be transmitted via delayed retrieval.

In either case, for each data entity to be retrieved in a delayed fashion, a content encryption key is randomly selected in Step 202. The content key may then be used to encrypt the data entity, where a hash algorithm is applied to the result of the encryption. This allows the end user, at some later point, to determine if the data has been altered, to verify authenticity of the data entity.

Figure 3:
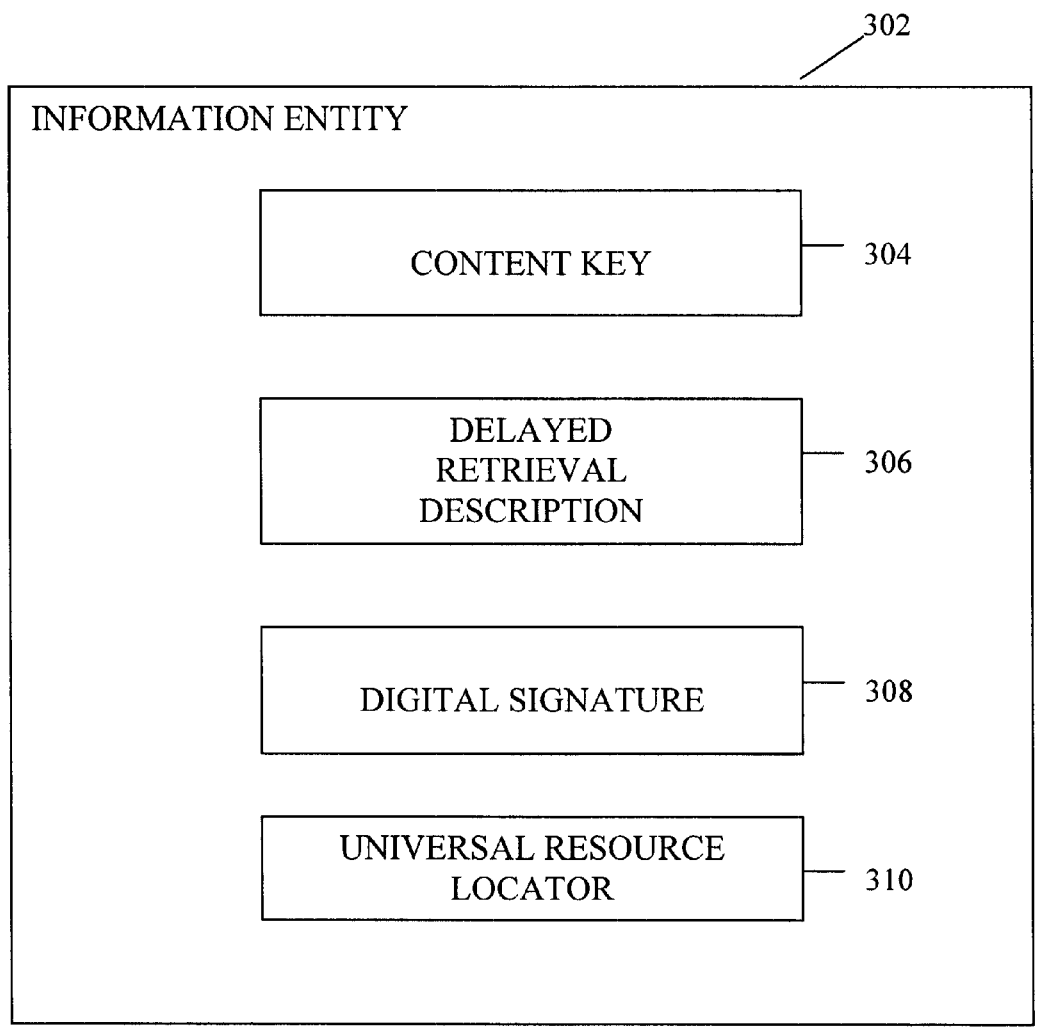
FIG. 3 illustrates an information entity and its contents in accordance with the present invention.

Then the content key is itself encrypted using the public key of a publisher's server (called the clearance center) for validating terms and conditions for accessing the data entity in step 204. Once this is done, the publisher builds an information entity 302 in Step 206, as shown in FIG. 2, using an information entity builder which resides on the content server 102, illustrated in FIG. 1. Returning to FIG. 3, the information entity contains the following items. First is the encrypted content encryption key 304, encrypted by the public key of the publisher's clearance center. The public key is used to encrypt the content key so that only the clearance center can decrypt the content key using its private key. This prevents unauthorized access to the content key, and thus, to the data entity itself. Second, the information entity also contains a delayed retrieval description 306. The delayed retrieval description provides information regarding where the data entity is stored in the publisher's store, 104 in FIG. 1, and which program is to be used to handle retrieval of the data entity. The delayed retrieval description also contains a copy of the content key, encrypted by the public key of the publisher's content server. The delayed retrieval description is digitally signed, as evidenced by a digital signature 308, using the publisher's private key to form a message digest. This can then be used by the publisher at a later time to validate content when the data is retrieved. Finally, the information entity contains a Universal Resource Locator (URL) 310 which is used later to locate the publisher's content server.

The information entity is then sent from the content server to the end user in Step 208 and may be opened by the information entity player, 106 in FIG. 1, which resides on an end user's machine. The information entity player 106 has a built in viewer that allows the user to navigate the content of the information entity. If the user is interested in obtaining the data entity associated with the information entity, a request is issued to the information entity player in Step 210, which in turn, sends the delayed information in the information entity along with a retrieval request to the content server pointed to by the URL in Step 212.

The content server authenticates the request by examining the message digest of the delayed retrieval description in the information entity, by using the publisher's public key, to ensure the delayed retrieval description has not been tampered with and to prevent unauthorized access to the data entity.

The content server then uses the publisher's private key to decrypt the content key. Further, the content server uses the information entity's delayed retrieval description to retrieve the requested data entity from the stores in Step 214. Subsequently, the content key is used to encrypt the data item again.

This scheme guarantees that the retrieval request can be authenticated. Also, since only the publisher knows the content key, the end user cannot unlock the content in any unintended way. In particular, when sending a retrieval request to a content server, the user cannot just pick a content key to get a free copy of the data item. Further, the publisher does not need a database for content key management, since the key and the retrieval information are stored together in the cryptolope. This eases content delivery management.

Within the cryptolope, content key is separately encrypted by a holding key, which in turn is encrypted by a clearance center's public key when the cryptolope is packed. Thus, only the clearance center's private key is capable of unlocking the holding key and thus, unlocking the content key, and eventually unlocking the data entity. In order for the player to unlock the data entity, the player needs to gather information from the user, such as payment information, and then sends the information together with the terms and conditions of the data entity to the clearance center. Upon approval, the clearance center sends the unlocked content key to the player to unlock the data entity. These subsequent processing steps are well known and need not be discussed in further detail.

The clearance center may reside on a machine hosted by the publisher, i.e. on the content server, or a third party. The clearance center processes the requests sent from the information entity player and instructs the information entity player on how to open the information entity. It is quite expensive to host a clearance center with credit card payment, for example. That is one of the reasons why a clearance center is sometimes hosted by a party other than the publisher itself.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, the present invention discloses a method, apparatus, and article of manufacture for a computer-implemented for delayed secure data retrieval.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for securely retrieving a data entity over a network system having a content server, a store and a client, the method comprising the steps of:

creating an information entity at the content server, the information entity containing a delayed retrieval description, for retrieving the data entity, and content server location information;

sending the information entity to the client;

detecting when the information entity has been opened at the client; transmitting the delayed retrieval description within a retrieval request back to the content server, in accordance with the content server location information, when the client desires access to the data entity;

retrieving the data entity from the store in accordance with the delayed retrieval description;

encrypting the data entity in accordance with a content key stored in the delayed retrieval description; and sending the data entity to the client.

2. The method according to claim 1, wherein the delayed retrieval description contains:

information regarding a location of the data entity in the store; and information regarding how to retrieve the data entity.

3. The method according to claim 1, wherein the content server location information comprises a universal resource locator (URL), identifying the location of the content server.

4. The method according to claim 1, further comprising the steps of, prior to the step of creating the information entity, randomly selecting a content key;

encrypting the data entity, thereby generating a digital signature;

encrypting the content key, thereby creating an encrypted content key; and after the step of creating the information entity, storing the encrypted content key in the information entity.

5. The method according to claim 1, wherein the delayed retrieval description is digitally signed, thereby allowing the content server to authenticate the retrieval request.

6. The method according to claim 1, further comprising the steps of:

during the creating the information entity step:

encrypting the content key with a holding key, the content key having been used to encrypt the data entity a first time; and encrypting the holding key with a clearance center public key; and after the step of sending the data entity to the client:

providing information from the client to the clearance center to satisfy terms and conditions for accessing the data entity; and providing to the client a decrypted holding key when the terms and conditions are satisfied, the decrypted holding key being used to decrypt the encrypted content key at the client to thereby decrypt the data entity.

7. An apparatus for securely retrieving a data entity over a network, the apparatus comprising:

a) a content server, which creates an information entity, the information entity containing a delayed retrieval description for retrieving the data entity and content server location information; and b) an information entity player, associated with a client, wherein the information player receives the information entity from the content server;

wherein the information player opens the information entity;

wherein the information entity player sends the delayed retrieval description within a retrieval request back to the content server, in accordance with the content server location information when the client desires access to the data entity;

wherein the content server retrieves the data entity from the store in accordance with the delayed retrieval description;

wherein, the content server encrypts the data entity in accordance with a content key stored in the delayed retrieval description; and wherein the content server sends the data entity to the client.

8. The apparatus according to claim 7, wherein the delayed retrieval description contains:

information regarding a location of the data entity in the store; and information regarding how to retrieve the data entity.

9. The apparatus according to claim 7, wherein the content server location information comprises a universal resource locator (URL), identifying the location of the content server.

10. The apparatus according to claim 7, wherein the content server further randomly selects a content key, encrypts the data entity, thereby generating a digital signature, encrypts the content key, thereby creating an encrypted content key, and stores the encrypted content key in the information entity.

11. The apparatus according to claim 7, wherein the delayed retrieval description is digitally signed, thereby allowing the content server to authenticate the retrieval request.

12. The apparatus according to claim 7, further comprising a clearance center, wherein the information entity further contains the content key encrypted by a holding key, the content key having been used to encrypt the data entity a first time, and the information entity further contains the holding key encrypted by a clearance center public key;

wherein after the content server sends the data entity to the client, the client provides information to the clearance center to satisfy terms and conditions for accessing the data entity; and wherein the clearance center provides a decrypted holding key to the client when the terms and conditions are satisfied, the decrypted content key being used to decrypt the content key to thereby decrypt the data entity sent to the client.

13. An article of manufacture comprising a program storage device readable by a computer and tangibly embodying one or more programs of instructions executable by the computer to perform method steps for securely retrieving a data entity over a network system having a content server, a store and a client, the method comprising the steps of:

creating an information entity at the content server, the information entity containing a delayed retrieval description for retrieving the data entity and content server location information;

sending the information entity to the client;

detecting when the information entity has been opened at the client;

transmitting the delayed retrieval description within a retrieval request back to the content server, in accordance with the content server location information, when the client desires access to the data entity;

retrieving the data entity from the store in accordance with the delayed retrieval description;

encrypting the data entity in accordance with a content key stored in the delayed retrieval description; and sending the data entity to the client.

14. The article of manufacture according to claim 13, wherein the delayed retrieval description contains:

information regarding a location of the data entity in the store; and information regarding how to retrieve the data entity.

15. The article of manufacture according to claim 13, wherein the content server location information comprises a universal resource locator (URL), identifying the location of the content server.

16. The article of manufacture according to claim 13, wherein the method further comprises the steps of, prior to the step of creating the information entity, randomly selecting a content key;

encrypting the data entity, thereby generating a digital signature;

encrypting the content key, thereby creating an encrypted content key; and after the step of creating the information entity, storing the encrypted content key in the information entity.

17. The article of manufacture according to claim 13, wherein the delayed retrieval description is digitally signed, thereby allowing the content server to authenticate the retrieval request.

18. The article of manufacture according to claim 13, wherein the method further comprises the steps of:

during the creating the information entity step:

encrypting the content key with a holding key, the content key having been used to encrypt the data entity, a first time; and encrypting the holding key with a clearance center public key; and after the step of sending the data entity to the client:

providing information from the client to the clearance center to satisfy terms and conditions for accessing the data entity; and providing to the client a decrypted holding key when the terms and conditions are satisfied, the decrypted holding key being used to decrypt the encrypted content key at the client to thereby decrypt the data entity.

* * * * *